Dec. 7, 1965     F. A. KAMAN     3,222,096
ROTARY TOOL SPINDLE
Filed April 15, 1963
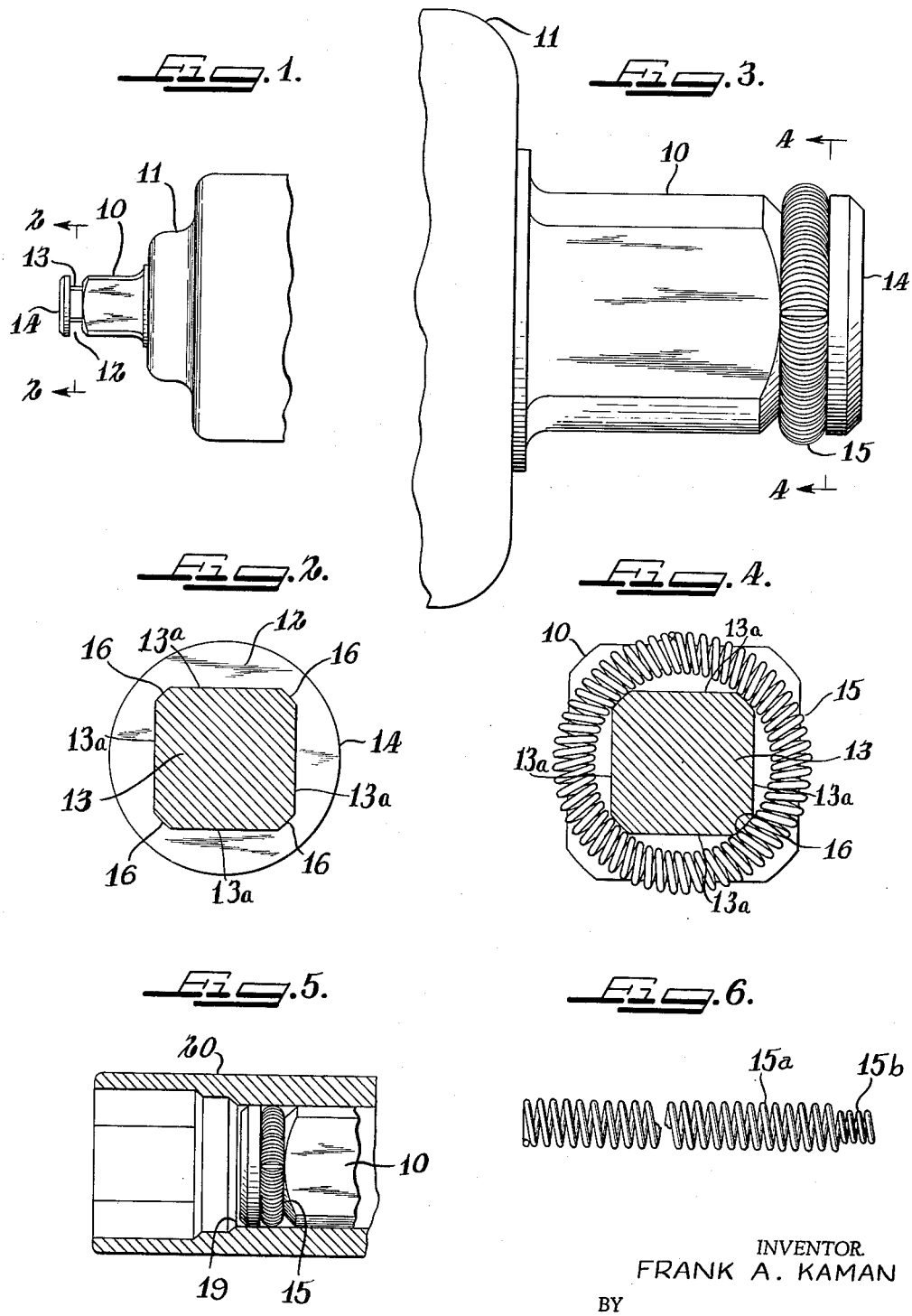
INVENTOR.
FRANK A. KAMAN
BY
Cromwell, Greist & Warden
Attys.

United States Patent Office 3,222,096
Patented Dec. 7, 1965

3,222,096
ROTARY TOOL SPINDLE
Frank A. Kaman, West Prospect Heights, Ill., assignor to Skil Corporation, Chicago, Ill., a corporation of Delaware
Filed Apr. 15, 1963, Ser. No. 273,143
1 Claim. (Cl. 287—53)

This invention relates to rotary tool spindles, and more particularly to retaining means for detachably securing a work-engaging member to such spindles.

Rotary power tools, such as screwdrivers, nutsetters, impact wrenches and the like, are customarily provided with spindles, which spindles project from the casing of the tool and include retaining means adapting them for detachably securing a desired work-engaging member to the power tool. Such retaining means very often include a detent and spring contained in a bore transversely disposed in the spindle near the end thereof, which spring urges the detent outwardly for engagement with a co-operating depression formed in the wall of a socket in the work-engaging member. Retaining means of this nature have not proved completely satisfactory for a number of reasons the most important of which are the tendency of the spindles to break because of the bore drilled therein and the likelihood of the detent or spring to become broken or stuck in the spindle. Other retaining means for spindles have included split rings adapted to be received on the spindle. This means of securing a work-engaging member to the spindle has not proved to be satisfactory because of the difficulty and expense involved in attaching the split ring on the spindle and because of the inadequate frictional engagement that a split ring provides in engaging the socket of the work-engaging member.

Accordingly, it is a principal object of this invention to provide new and improved retaining means for detachably securing a work-engaging member to the spindle of a rotary tool.

It is a further object of this invention to provide retaining means for detachably securing a work-engaging member to the spindle of the rotary tool, which means includes a single continuous compressible ring adapted to be removably received in a groove provided in the spindle.

It is an even further object of this invention to provide retaining means for detachably securing a work-engaging member to the spindle of a rotary tool, which retaining means is inexpensive to manufacture and may be quickly and easily attached to a rotary spindle without the aid of a tool of any kind.

These and other objects and advantages of the invention will become apparent from the following specification wherein like numerals refer to similar parts throughout.

In the drawings:
FIG. 1 is a fragmentary side view of a rotary power tool showing the front end of a spindle extending from the nose of the tool;
FIG. 2 is a section taken along the line 2—2 of FIG. 1;
FIG. 3 is an enlarged side view of the front end of a rotary spindle showing a specific embodiment of the retaining means of this invention attached thereto;
FIG. 4 is a section taken along the line 4—4 of FIG. 3;
FIG. 5 is a fragmentary side view of the front end of a rotary spindle showing the same detachably secured by an embodiment of the retaining means of this invention in the socket of a work-engaging member, which member is shown in longitudinal section; and
FIG. 6 is a view of a specific embodiment of the retaining means of this invention showing the same before it is assembled for attachment to a spindle.

Referring especially to FIG. 1, the front end of a spindle 10 is shown projecting forwardly from the nose 11 of a tool, such as a rotary power tool. The spindle shown for purposes of illustration is generally square in cross-section, and it includes a groove 12 encircling the same near the tip thereof, which groove forms a neck portion 13 of reduced size. The neck portion includes flat walls 13a defining linear base portions of groove 12. The tip of the spindle 10 is circular in cross-section forming a cap 14, which cap has a diameter approximately the same as the length of one of the sides of the square spindle.

A specific embodiment of the retaining means of this invention is best seen in FIGS. 3, 4 and 6. The embodiment of the retaining means shown will be seen to include a toroid or ring-like coil spring 15, which spring is adapted to be removably received in the groove 13 provided in the spindle 10. The spring 15 is of a size such that when in place on the spindle in the groove 13 the portions of the periphery of the spring intermediate the corners of neck portion 13, which corners have flat faces 16 forming seats for the ring, will extend beyond the peripheral limits of the main portion of the spindle. These mentioned portions of the spring 15 provide for a secure frictional engagement with the socket of a work-engaging member as will be referred to hereinafter.

The toroid coil spring 15 may be easily assembled and attached in place on a spindle having a groove therein for reception of the same. FIG. 6 shows a length of coil spring 15a adapted to be formed into a toroid or ring for forming an embodiment of the retaining means of this invention. The spring 15a has at one end thereof a portion 15b of reduced diameter, which portion is adapted to be received in thread-like fashion in the other end of the coil spring 15a. To assemble the spring 15a into the shape of a toroid it is only necessary to twist the spring along the length thereof, i.e., about the longitudinal axis of the spring, for a few revolutions, insert the reduced end portion 15b into the other end of the spring, and then release the spring. As the spring untwists about its axis, the end 15b will engage the other end of the spring 15a in a threadlike fashion, thereby forming the continuous ring or toroid spring 15.

Of course it will be realized that the ends of the spring 15a could be attached to each other in any suitable fashion for forming the retaining ring 15. Also, the toroid spring 15 could be formed as a single continuous ring during the manufacture thereof, thereby obviating the later step of joining the ends of the length of coil spring to form the retaining spring.

FIG. 5 shows the spindle 10 having the retaining spring 15 attached thereto in place in the socket 19 of a work-engaging member 20, which is shown as a nutrunner, for detachably securing the work-engaging member 20 to the spindle 10. The spindle 10 having the spring 15 attached thereto is adapted to be easily inserted within the socket 19, but once in place in the socket the retaining spring 15 provides a secure frictional engagement with the walls of the socket for detachably securing the work-engaging member 20 in place on the spindle 10. As seen in FIG. 4, the peripheral portions of the ring 15 intermediate the corners of the spindle are adapted to extend beyond the peripheral limits of the spindle 10 when the spring 15 is in its normal position on the same, i.e., when the spring 15 is allowed to assume its shape on the neck portion 13 in the groove 12. When the spindle 10 is co-axially aligned with the socket 19 of the work-engaging member 20 and moved into the socket, the peripheral portions of the ring 15 intermediate the corners of the spindle 10 will be deflected inwardly allowing the spindle 10 to be forced home within the socket 19. Since the spring 15 is circular in cross-section the portions thereof projecting beyond the peripheral limits of the spindle present an arcuate or rounded surface which is easily deflected within the walls of the socket by engagement of the same. Because the toroid spring 15 is formed from a coil spring, it is adapted to be deflected inwardly in the groove 12 without buckling as it is compressible along the length thereof. As noted in FIG. 4, the linear base portions of groove 12, i.e. flat walls 13a of neck portion 13, define chords of the circle defined by the inside of spring 15. When the spindle 10 is forced within the socket 19 of the work-engaging member 20, the peripheral portions of the spring 15 extending beyond the peripheral limits of the spindle are deflected in the groove 12 in the spaces therein defined by the inner surface of the ring 15 and the flat walls 13a of the square neck portion 13. The spring 15 is formed of relatively stiff wire giving the spring a strong tendency to return to its toroidal shape. Accordingly, when the spring is in its distorted or deflected position in the socket of a work-engaging member, the outward forces produced by the spring in attempting to return to its natural shape will result in a secure frictional engagement between the spring and the socket walls. In this way the work-engaging member will be securely but detachably mounted on a spindle.

Thus it can be seen that by this invention new and improved retaining means have been provided for a rotary spindle adapting the same to frictionally engage the socket of a work-engaging member for detachably securing the same to the spindle of a rotary tool. The retaining means of this invention is simple in construction and easy and inexpensive to manufacture. The spindle adapted to receive the retaining means of this invention need only be provided with a groove encircling the same, which groove is adapted to removably receive the toroid coil spring 15. The toroid coil spring 15 may be readily attached to the spindle 10 as it is only necessary to stretch the spring slightly and then allow it to snap in place within the groove 12 formed on the spindle 10. No tools are required for mounting the retaining means of this invention on a spindle. It will be realized that the spring 15 of a size so that it may be stretched to a ring size having an inside diameter equal to the diameter of the spindle cap 14 and yet have its peripheral portion extend beyond the peripheral limits of the spindle when the spring is in place on the spindle. The spring 15 may be manufactured as a complete ring, or it may be made as illustrated in FIG. 6 wherein the ends of the spring are formed allowing them to be readily and easily connected without the aid of tools.

In considering the scope of the present invention, it will be realized that the retaining means of this invention could be provided other than in the form of the toroid coil spring shown. The retaining means of this invention encompasses any form of a single continuous resilient member, which member is adapted to be compressed or shortened along the length thereof. For example, a single wire spring corrugated along the entire length thereof could be provided in lieu of the spring 15. Further, it will be realized that one or a number of retaining springs could be used as desired.

While the invention has been illustrated in but one form it will be obvious to those skilled in the art that it is not to be so limited, but rather it is susceptible of various changes and modifications without departing from the spirit and scope of the appended claim.

I claim:

In rotary tool spindle adapted to project into a complementary shaped socket of a work-engaging member for driving the same, the improvement comprising, said spindle including a continuous groove encircling the spindle and thereby forming a neck portion having a perimeter less than the perimeter of said spindle, a continuous resilient and substantially annular ring capable of being shortened along the length thereof, which ring is seated in said groove, said groove having a plurality of linear base portions forming chords with the circle defined by the inner periphery of said ring thereby to provide spaces to receive portions of the ring upon their deflection in entering an associated socket, said groove also including a plurality of seat portions equal in number to the number of base portions and joining with the base portions between opposite ends thereof, which seat portions each engage said ring along a portion of the length thereof and support the ring in concentric relation with the spindle, the radius of said neck portion at each seat portion being greater than the distance from the axial center of said neck portion to the midpoint of each of said base portions, said ring having the first mentioned portions thereof extending beyond the peripheral limits of said spindle for frictional engagement with the walls of an associated socket.

References Cited by the Examiner

UNITED STATES PATENTS

| | | | |
|---|---|---|---|
| 2,288,516 | 6/1942 | Davis et al. | 287—52 X |
| 2,322,949 | 6/1943 | Lux. | |
| 2,455,544 | 12/1948 | Yonkers | 285—321 X |
| 2,704,681 | 3/1955 | Fischer | 287—126 |
| 2,991,064 | 7/1961 | Jean. | |

FOREIGN PATENTS 674,720   6/1952   Great Britain.

CARL W. TOMLIN, *Primary Examiner.*

ROBERT C. RIORDON, THOMAS F. CALLAGHAN,
*Examiners.*